(12) United States Patent
Chen

(10) Patent No.: US 6,630,967 B2
(45) Date of Patent: Oct. 7, 2003

(54) CURRENT-TYPE TOUCH CONTROL LIQUID CRYSTAL PANEL AND A CURRENT TOUCH SHIELD

(75) Inventor: Chi Ruey Chen, Chung-Li (TW)

(73) Assignee: eTurboTouch Technology Inc., Chung-Li (TW)

( * ) Notice: Subject to any disclaimer, the term of this patent is extended or adjusted under 35 U.S.C. 154(b) by 110 days.

(21) Appl. No.: 09/931,235

(22) Filed: Aug. 17, 2001

(65) Prior Publication Data
US 2002/0167621 A1 Nov. 14, 2002

(30) Foreign Application Priority Data

May 8, 2001 (TW) ........................... 90207465 U

(51) Int. Cl.⁷ ............... G02F 1/1335; G02F 1/1333; G09G 3/36; G09G 5/00
(52) U.S. Cl. ................. 349/12; 349/84; 345/104; 345/173
(58) Field of Search .............. 349/12, 84; 345/173, 345/179, 87, 104

(56) References Cited

U.S. PATENT DOCUMENTS

| | | | | | |
|---|---|---|---|---|---|
| 4,484,038 | A | * | 11/1984 | Dorman et al. | 200/5 A |
| 5,623,280 | A | * | 4/1997 | Akins et al. | 345/104 |
| 6,020,943 | A | * | 2/2000 | Sonoda et al. | 349/61 |
| 6,329,044 | B1 | * | 12/2001 | Inoue et al. | 428/209 |
| 6,501,528 | B1 | * | 12/2002 | Hamada | 349/158 |
| 2001/0022632 | A1 | * | 9/2001 | Umemoto et al. | 349/12 |
| 2001/0026330 | A1 | * | 10/2001 | Oh | 349/12 |

* cited by examiner

Primary Examiner—Tarifur R. Chowdhury
(74) Attorney, Agent, or Firm—Bacon & Thomas, PLLC

(57) ABSTRACT

A current-type touch control liquid crystal panel comprises an upper substrate; a lower substrate; a gap defined by the upper substrate and the lower substrate; a polymer filled into the gap; and a current touch shield which is printed on the upper surface of said upper substrate and which is adapted to be touched by a user's finger or a conductive member to carry out a writing or drawing operation.

3 Claims, 5 Drawing Sheets

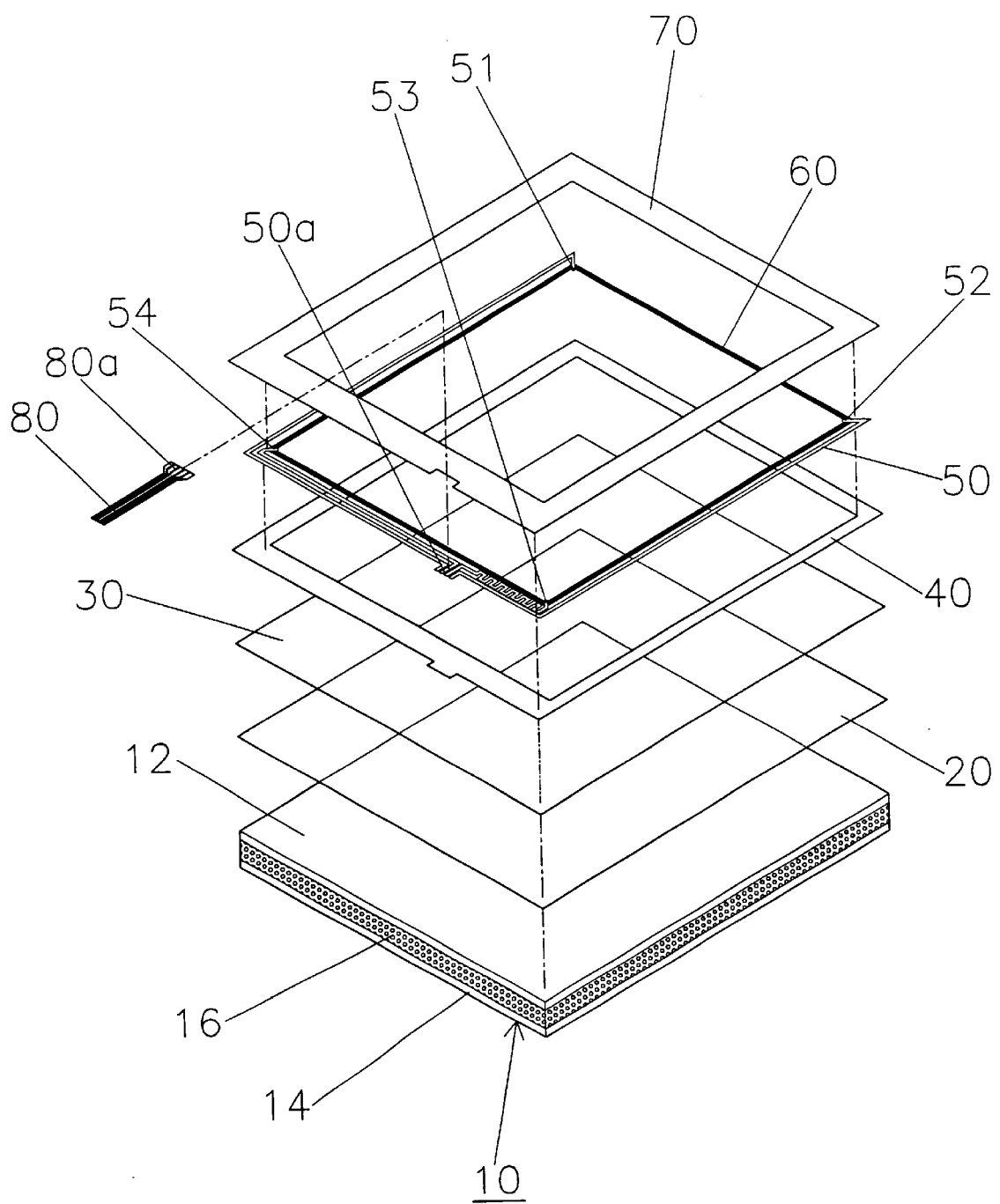
FIG:1

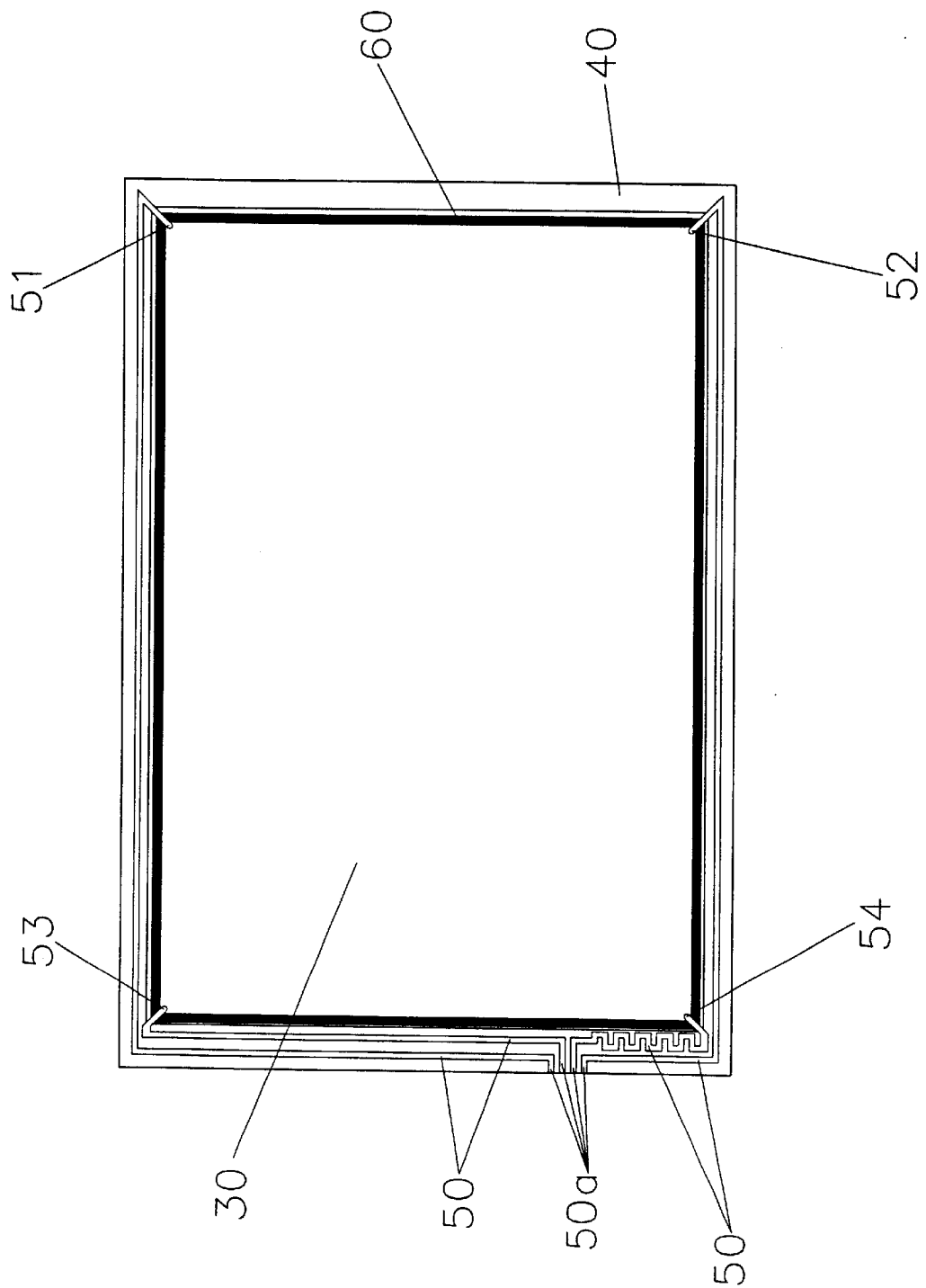
FIG:2

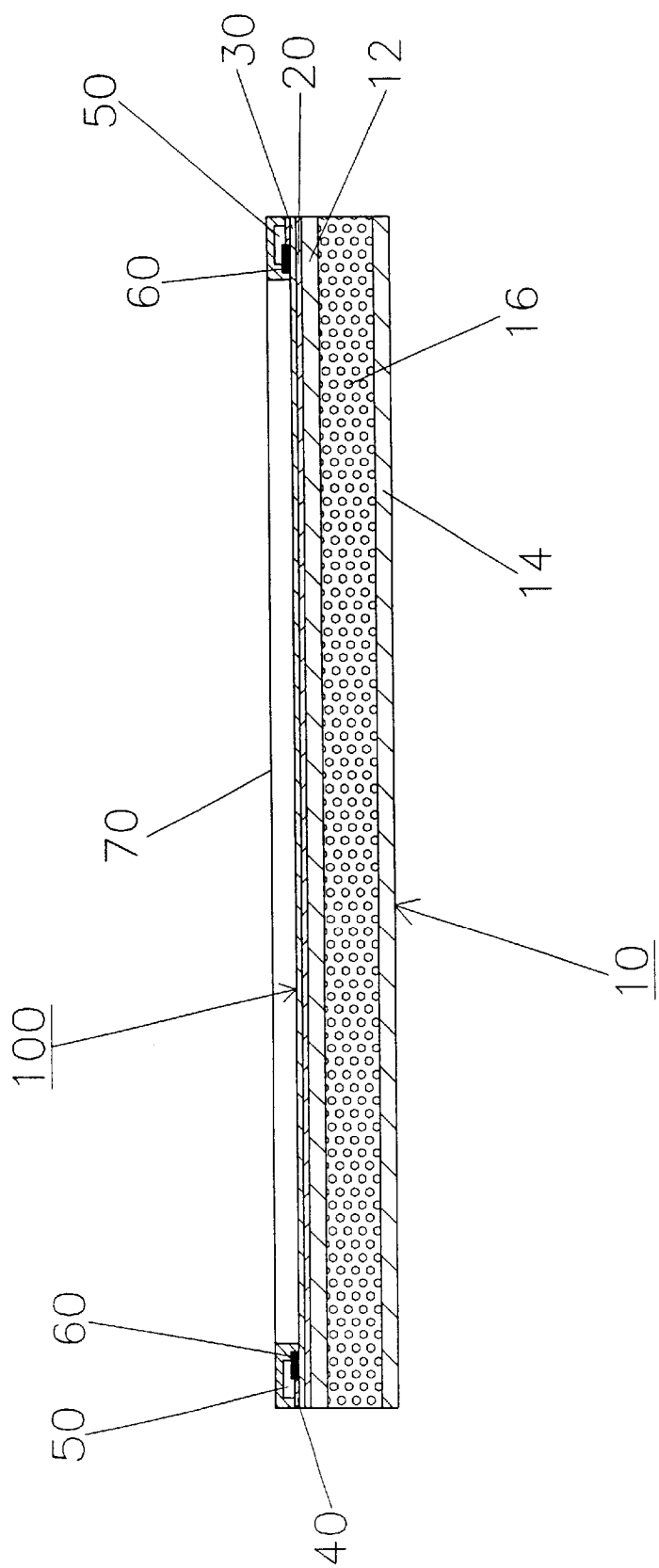
FIG:3A

CURRENT-TYPE TOUCH CONTROL LIQUID CRYSTAL PANEL AND A CURRENT TOUCH SHIELD

BACKGROUND OF THE INVENTION

The present invention relates to a liquid crystal panel, more particularly, to a current-type touch control liquid crystal panel which generates a current reference value by the touch of a user's finger or a conductive member, thereby writing, drawing or other functions may be made.

Conventional current touch detectors are disclosed in U.S. Pat. Nos. 4,853,498, 3,798,370 and 3,798,370. There prior patents disclose a controller which outputs four equal voltages upon touch of the panel for detecting the current change to determine the touching position when the touch panel is touched and pressed. Such a technique is taught in R.O.C. patent application No. 83203161 as well, which discloses the detection of the data process system of the contact-pressure point and contact force provided by a user by means of current change reference value when a touch panel is pressed. In this R.O.C. patent, a press conductive plate is utilized to press an elastic member to cause a displacement of the conductive plate toward the first control plate. Thus, the first control plate forms a capacitor, the value of which is determined by the distance between the conductive plate and the first control plate Evidently, in this R.O.C. patent, the displacement of the conductive plate is utilized to cause a capacitance change for measuring the value of the capacitor. Since a user must use his finger or a conductive member to cause the displacement of the conductive plate, such an operation is not practical.

SUMMARY OF THE INVENTION

To overcome the drawbacks of the conventional current-type touch detectors, an object of the present invention is to provide a current-type touch control liquid crystal panel which has a reduced thickness and volume so as to reduce the cost and promote the accuracy of the touch control.

To achieve the object mentioned above, the present invention provides a current-type touch control liquid crystal panel, comprising:

an upper substrate;

a lower substrate;

a gap defined by the upper substrate and the lower substrate;

a polymer filled into the gap; and a current touch shield which is printed on the upper surface of said upper substrate and which is adapted to be touched by a user's finger or a conductive member to carry out a writing or drawing operation.

BRIEF DESCRIPTION OF THE DRAWING

The above objects and advantages of the present invention will become more apparent by the following detailed description of a preferred embodiment thereof in conjunction with the accompanying drawings, in which:

FIG. 1 is an exploded view of a current-type touch control liquid crystal panel according to the present invention;

FIG. 2 shows a perspective view of the silver printing layer printed on the conductive membrane according to the present invention;

FIG. 3A shows a cross sectional view of the a current-type touch control liquid crystal panel;

DETAILED DESCRIPTION OF THE PREFERRED EMBODIMENT

Figure 3B:
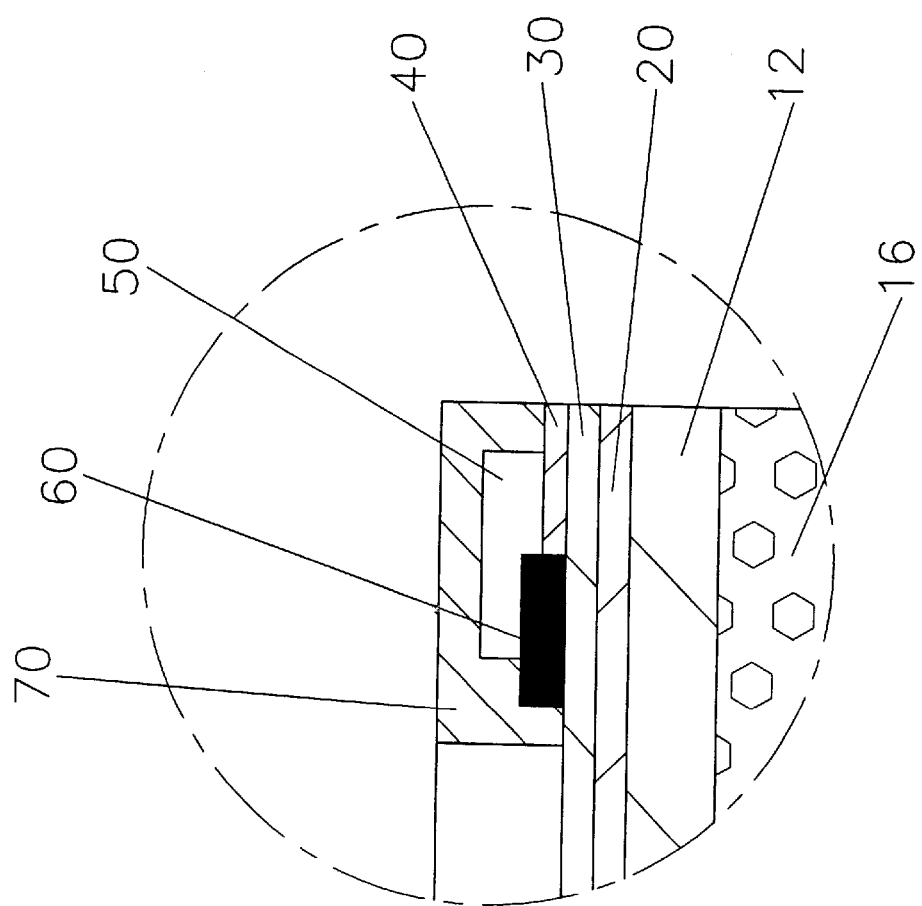
FIG. 3B shows a partially enlarged cross-sectional view of a current-type touch control liquid crystal panel according to the present invention.

Referring now to FIGS. 1, 2 and 3 the liquid crystal panel according to the present invention comprises a panel 10 including an upper substrate 12, a lower substrate 14, a gap being defined by therebetween, and a polymer 16 filled into the gap; and a current touch shield 100 which is adapted to be printed on the upper surface of the upper substrate and which is touched by a user's finger or conductive member to carry out a writing or drawing operation.

Said current touch shield 10 includes a transparent or translucent conductive membrane 20 made from Indium Tin Oxide (ITO) and printed on the upper surface of the upper substrate 12; a transparent or translucent conductive protective layer 30 printed on the conductive membrane 20; a lower isolation panel 40 printed on the periphery of the conductive protective layer 30; a plurality of silver printing layers 50 printed on the surface of the isolation panel 40; a linearization panel 60 printed on the conductive protective layer 30, said linearization panel 60 being disposed on the inner edge of the silver printing layers 50 with the four corners thereof corresponding to the four connecting ends 51,52,53,54 of the layers 50; an upper isolation panel 70 being printed on the silver printing layers 50 and the linearization panel 60, respectively.

According to the foregoing, said upper substrate 12 is a transparent polarizing plate. This embodiment further comprises a flexible tail 80, a connecting end 80a of which is connected to an outer connecting end 50a of the silver printing layers 50.

Referring to FIGS. 1,2 and 3, according to the main technique of this embodiment, the current touch shield 100 is printed on the upper substrate 12 which is a transparent polarizing plate itself so that the finger of a user or a conductive material can contact it for achieving a writing or drawing operation. The conductive membrane 20 which is made from Indium Tin Oxide (ITO) and is transparent, is printed on the surface of the upper substrate 12. Since the conductive membrane is relatively thin, it can be easily scraped and damaged. Therefore, a thin conductive protective layer 30 is printed on the conductive membrane 20 so as to prevent it from being scraped. The conductive protective layer 30 is made from a transparent membrane and is of conductive characteristic.

The linearization panel 60 is made from silver powder, carbon powder and an adhesive which adheres them together. Thus, the linearization panel 60 is substantially a print ink layer. Such a material can be printed into uniform resistor line and is disposed on the periphery of the conductive protective layer 30. Each silver printing layer 50 includes a plurality of silver lines which are printed on the periphery of the lower isolation panel 40. Preferably, the silver printing layers 50 includes four silver lines having four connecting ends 51, 52, 53, 54 which are connected to the connecting end 80a of the flexible tail 80. The outer end of the tail 80 is connected to a controller (not shown).

The upper isolation panel 70 is printed on both the linearization panel 60 and the silver printing layer 50 to impart isolation characteristic thereto.

Figure 4:
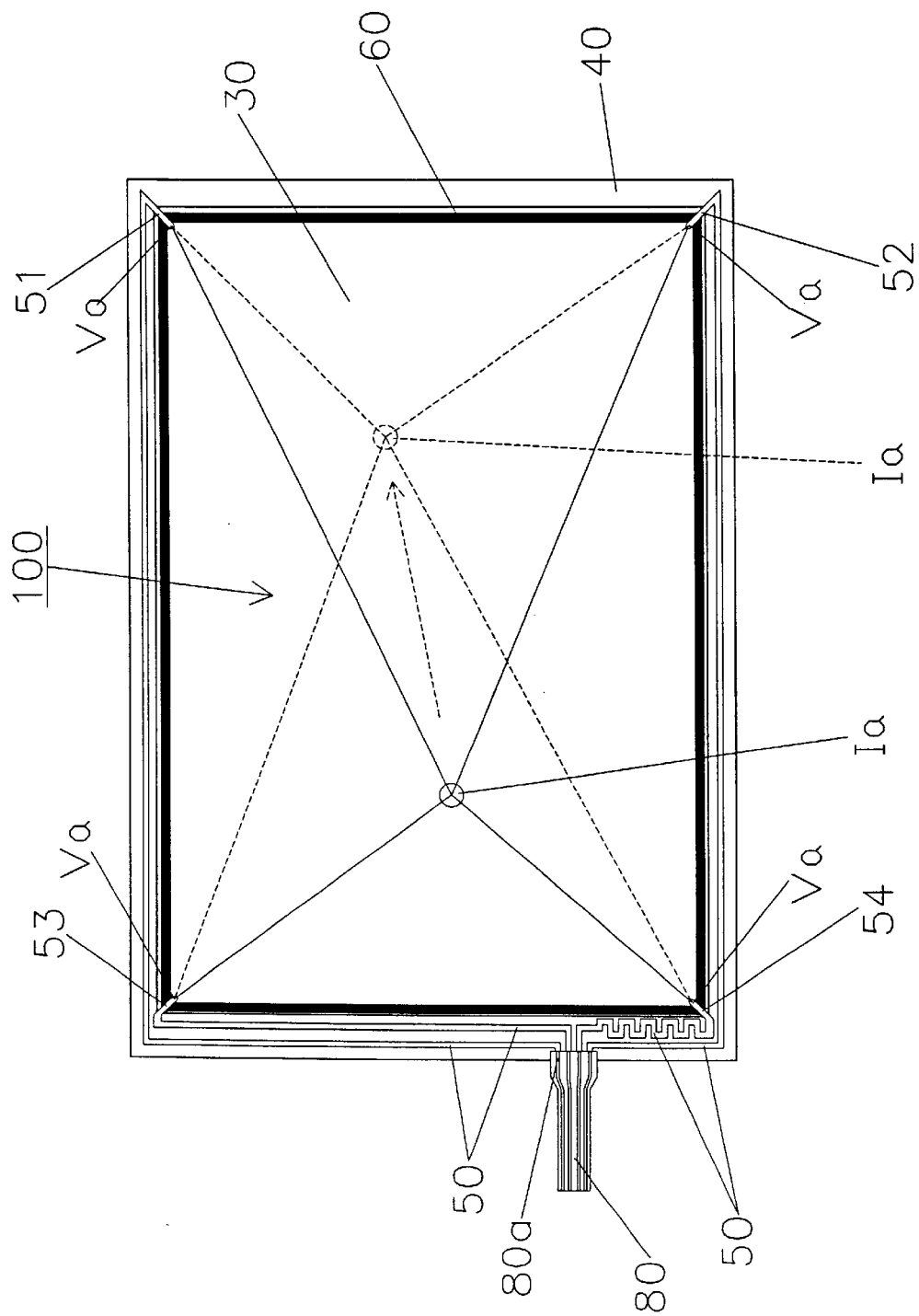
FIG. 4 shows a plan view of a current-type touch control liquid crystal panel according to the present invention.

The controller (not shown) outputs four equal voltages Va to four corners of the linearization panel 60 for measuring the current on the surface of the current touch shield 100. Referring to FIG. 4, when a user's finger or a conductive member touches the contact point on the surface of the current touch shield 100, a capacitance effect is formed. The four voltages Va may measure the current reference value Ia of the capacitance effect for determining the position of the contact point. At different contact point, their current reference values Ia are different from one another. The current reference value Ia measured by the controller may be read and processed by central processor unit (CPU) to generate a signal which is shown on the upper substrate 12. Therefore, the user may directly write some instructions (drawing instruction or other instruction) on the upper substrate 12.

The main feature of this embodiment is that the current touch shield 100 having a plurality of material layers is printed on the upper substrate 12 as a relatively thin layer. Due to the relative thinness of the conductive membrane 20, the protective layer 30, the lower isolation panel 40, the silver printing layers 50, the linearization panel 60 and the upper isolation panel 70, and the relatively thin width of the silver printing layer 50 and the linearization panel 60, the touch shield 100 almost cannot be detected on the upper substrate 12.

While there is shown and described herein certain specific structures embodying the present invention, it will be apparent to those skilled in the art that various modification and rearrangements of the parts may be made without departing from the spirit and scope of the underlying inventive concept.

What is claimed is:

1. A current-type touch control liquid crystal panel, comprising:

an upper substrate;

a lower substrate;

a gap defined by the upper substrate and the lower substrate;

a polymer filled into the gap; and a current touch shield which is printed on the upper surface of said upper substrate and which is adapted to be touched by a user's finger or a conductive member to carry out a writing or drawing operation;

wherein said current touch shield comprises:

a transparent or translucent conductive membrane made from Indium Tin Oxide (ITO) and printed on the upper surface of said upper substrate;

a transparent or translucent conductive protective layer printed on said conductive membrane;

a lower isolation panel printed on said periphery of the conductive protective layer;

a plurality of silver printing layers printed on the surface of said isolation panel;

a linearization panel printed on said conductive protective layer, said linearization panel being disposed on the inner edges of said silver printing layers and the four corners thereof being connected to the four connecting ends of said layers; and an upper isolation panel printed on said silver printing layers and the linearization panel, respectively.

2. A current-type touch control liquid crystal panel as claimed in claim 1, wherein the upper substrate is a transparent polarizing plate.

3. A current-type touch control liquid crystal panel as claimed in 1, further comprising a flexible tail which includes a connecting end connected to said silver printing layer.

* * * * *